April 10, 1928.
L. A. BRINKMAN
PELORUS
Filed May 31, 1923
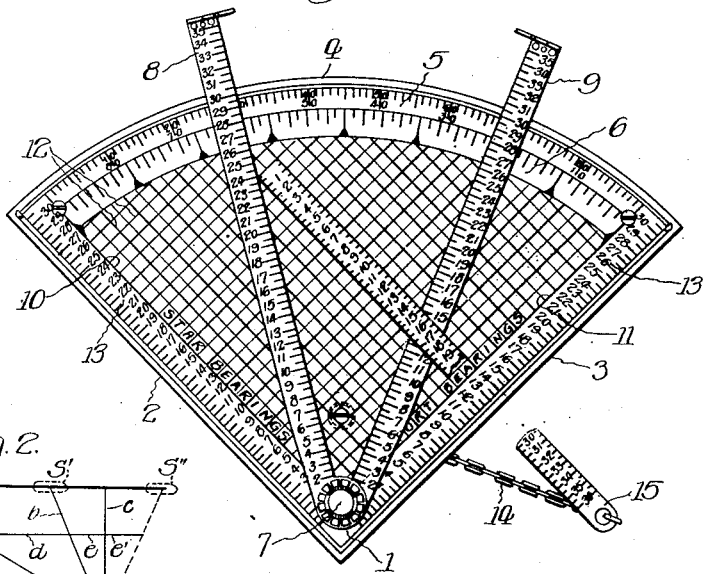
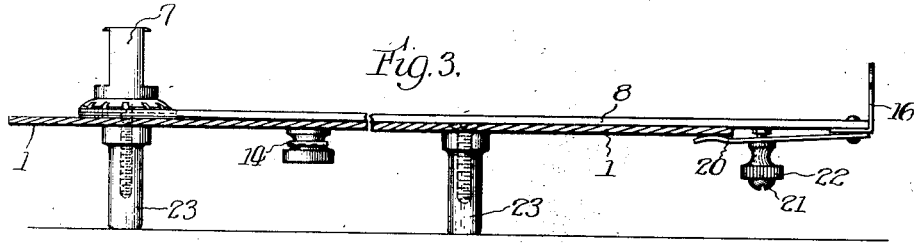
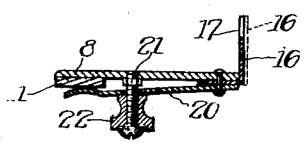
Inventor:
Lewis A. Brinkman,
By Kent W. Wonnell
Atty Patented Apr. 10, 1928.

1,665,527

UNITED STATES PATENT OFFICE.

LEWIS A. BRINKMAN, OF CHICAGO, ILLINOIS.

PELORUS.

Application filed May 31, 1923. Serial No. 642,700.

This invention relates to a device particularly designed for use in navigation for taking bearings, estimating distances, plotting courses, establishing departures, and many other uses which will suggest themselves to the navigator as he becomes familiar with the device. The instrument is not a regular sextant, pelorus, mooring board, or bearing finder, but it has some of the features of all of them. The principal object of the invention is to provide a simple, quickly operated means of taking bearings, estimating distances, and establishing departures. Other objects of the invention will appear hereinafter.

In the accompanying drawings, Fig. 1 is a plan view of an instrument constructed in accordance with the principles of this invention; Fig. 2 is a diagram illustrating the use of the instrument; Fig. 3 is a sectional view of the instrument; Fig. 4 is a sectional detail; Fig. 5 illustrates the sights; and Fig. 6 is a section of one of the sight arm locks.

This instrument is used preferably in the pilot house against the front or side windows taking care that they are parallel or at right angles to the length of the ship. It will be observed that one side of the quadrant is marked for starboard bearings and the other side is marked for port bearings. Although the device is preferably designed and intended for use on ship board, it will be apparent that it could be used readily in other ways, as for example, with an automobile, and by surveyors.

The device proper comprising a plate 1 preferably of metal and in the form of a quadrant with edges 2 and 3 at right angles, and an arcuate outer edge 4, one margin 5 of which is graduated in circular degrees and another margin 6 of which is graduated in compass points.

Set in from the angular corner is a sight post 7 upon which are pivoted sight arms 8 and 9 adapted to be moved over the surface of the plate. Extending parallel to the edges 2 and 3 from the center of the sight post 7 are margin lines 10 and 11 having similar graduations, forming at the outer ends the limits of the marginal graduations 5 and 6, and being designated respectively as the side for starboard bearings and for port bearings. The surface of the plate 1 between the graduated margin lines and the circular margin 6 is lined or ruled off in squares 12 preferably of the same size as the marginal graduations 13 along the edges 2 and 3. The inner edges of the arms 8 and 9 are also provided with graduations to the same scale. Attached to the underside of the plate 1 by means of a chain 14 is a measuring rule 15, the edges of which are graduated in the same units which appear on the plate.

The arms 8 and 9 are so pivoted upon the post 7 that the inner edges thereof will abut, which necessitates that the pivoting portions of the arms be overlapped and the arms offset oppositely. At the outer end of each arm is a sight plate 16 with a notch 17 extending downwardly from the upper edge thereof. The sight plates are likewise offset so that they will overlap at the outer end, as indicated in Fig. 6 when the arms are placed close together. In this position the sight notches 17 will register with each other. At the center of the post 7 is a sight wire 18, and the inside of the post is suitably apertured at 19 to permit the wire to be seen from any portion of the quadrant, through the sight notches 17. This attachment produces the optical illusion when sighting at a distant object in that the upper portion of the wire 18, if viewed as shown in Fig. 5, appears much lighter or thinner than the lower portion 18' which is seen in the notch 17. This enables one to accurately set the arm when viewing a distant object.

In order to secure either of the arms in any fixed position, a resilient tongue 20 is attached to the underside at the outer end of the arm and is adapted to bear on the underside of the plate. A threaded stud or screw 21 is attached to the underside of the arm and extends through the tongue with a nut or thumb screw 22 to press the tongue against the underside of the plate. Thus after a sight has been taken with one of the arms it can be easily locked in position. Feet or supports 23 may also be provided for the underside of the plate 1 although they are not absolutely necessary.

In illustrating the use of this device a ship S in Fig. 2 is proceeding on a straight course at a known fixed speed and at a distance from a lighthouse L. As the lighthouse is on the starboard side the starboard edge 2 of the device is placed against a starboard window in the ship which is parallel with the length thereof. The sight is taken, and the arm 8 is locked in position. The ship then proceeds on her course for a certain time, and when it reaches the position S', another bearing is taken by means of the arm 9 which is then locked in place. Note what time has elapsed between the bearings taken, and the speed of the ship. It is now possible to determine a number of things. If we assume that 16 minutes, for example, have elapsed between the bearings, the margin of the rule 15 is applied between the arms 8 and 9 parallel to the starboard side until graduation 16 is reached. From the principles of similar triangles it is now possible to determine the distance $a$ at the time of the first bearing, the distance $b$ at the time of the second bearing, the distance $c$ which the ship will be from the lighthouse when it is abreast, and the total distance it must travel until it is abreast. Reading from the scales which are set for this condition in Fig. 1, it will be seen that the distance $a$ is just about 24 units, the distance $b$ is approximately 13 units, the distance $c$ is about 12 units, and the total distance when abreast will be 16 plus 5 or 21 units. If the travel between bearings are taken in minutes the answer will be in minutes, and if taken in miles the answer or rating will be in miles. If we assume, for example, that the ship is traveling 15 miles per hour, in 16 minutes it would travel 4 miles, and the distance can be computed that way, or the rating for miles taken directly by shifting the scale accordingly.

In case one bearing is abaft of the beam and the other is forward of the beam, one bearing will be taken with one side of the instrument and the other bearing with the instrument inverted. This condition would be represented on the diagram by the position S''. In such a case the run between the bearings is equal to the distance $d$ plus $e$ plus $e'$. By properly applying the rule 15 to the distance traveled, the required distances can be read as before. Many other conditions and uses can be taken care of which will be apparent to those using the device.

I claim:

1. In an instrument of the class described, a pair of bearing arms a notched sight plate at the outer end of each arm, common sight post upon which they are pivoted, and an angularly graduated plate, the graduations embracing a quadrant at the center of which is the bearing post and the plate also having rectangular graduations respectively parallel to and in the space between the limiting radii of the quadrant.

2. In a device of the class described, a pair of sight arms, a common post to which they are pivoted, a notched sight plate at the outer end of each arm, and a quadrantally-shaped plate to which the post is secured, said plate having rectangular graduations thereon, the inner adjacent edges of the sight arms being graduated in the same units as the plate.

3. In a device of the class described, a quadrantal plate having rectangular graduations thereon respectively parallel to the limiting radii of the said plate, a sight post at the center of said quadrant, and two longitudinal graduated sight arms pivoted on said post for movement over said graduations, the inner edge of said arms each being radial to the axis of the post.

4. In a device of the class described, a plate in the form of a quadrant with rectangular graduations on the face of the plate parallel to the radial edges thereof, a sight post mounted at the center of the quadrant, a pair of sight arms pivoted to the post, the inner edges of which are radial to the axis of the post, the inner edges of the arms being graduated in the same units as the rectangular graduations of the plate, a measuring bar applicable freely to the plate and having graduations at the edges in the same units as those of the plate.

5. In a device of the class described, a quadrantal plate having rectangular graduations thereon respectively parallel to the limiting radii of said plate, a sight post at the center of the quadrant including an upright sight wire, two longitudinal graduated sight arms pivoted on said post for movement over the quadrant, the inner edges of said arm each being radial to the axis of the sight wire, a sight plate at the outer end of each arm, and a measuring bar graduated at the edge in the same units as the plate and sight arms and applicable freely over the plate and said arms.

LEWIS A. BRINKMAN.